3,002,040
BATTERY SEPARATOR
Joseph A. Orsino, Mountain Lakes, N.J., and Charles E. Mandel, Ridgewood, N.Y., assignors to National Lead Company, New York, N.Y., a corporation of New Jersey
No Drawing. Filed Feb. 25, 1959, Ser. No. 795,369
3 Claims. (Cl. 136—146)

This invention relates to improved plate separators for use in storage batteries and to methods for preparing such separators.

In the manufacture of lead-acid storage batteries a recurrent problem has been that of providing suitable separators to protect the battery plates from short circuiting. Such separators are necessary in order to prevent minute particles of dislodged active material, which are always present in the electrolyte, from bridging across the small space which separates adjacent plates and thereby short-circuiting the battery. Such separators must be characterized by resistance to the sulfuric acid electrolyte, low electrical resistance and high porosity to allow free circulation of electrolyte, coupled however with a complete absence of pin-holes or direct channels which would allow bridging to take place despite the presence of the separator. Finally, such separators must be produced at a reasonable cost.

Numerous types of separators have been suggested in the past. Among these have been wood, impregnated paper, fiber glass, and microporous rubber separators. Of these, only the fiber glass and the rubber varieties were resistant to softening and degradation on prolonged exposure to the sulfuric acid electrolyte. Fiber glass separators were not entirely satisfactory; although sufficiently resistant to the acid, they invariably contained a certain number of direct passages from one side to the other through which bridging was able to take place.

The most successful type of separator suggested heretofore has been the porous rubber separator which couples acid resistance with controllable porosity and the virtual elimination of open holes or direct passages. Such passages as were (necessarily) present in order to permit permeation of the electrolyte were not direct but were sufficiently tortuous to effectively overcome the bridging problem. The rubber separators, however, suffered from the following disadvantages. They were expensive to produce due to the relatively high cost of the raw material and the difficulties encountered in the fabrication stages. Also many of the rubber separators tended to exhibit high electrical resistance which increased the internal resistance of the battery and decreased the amount of energy usefully available.

While the rubber separators did exhibit good acid resistance in batteries under normal operating conditions they did not fully retain this property during the frequently occurring situations in which the acid reached a high degree of concentration.

For instance, a not too uncommon occurrence in the use of batteries is one of overcharging. During this period water is lost by decomposition leaving the acid more concentrated. This concentrated acid results in a charring of the normally resistant rubber separators particularly at high temperatures (also a product of the loss of water) and over prolonged periods of time. These conditions can similarly result from failing to maintain the water at its proper level.

An object of this invention, therefore, is to provide a battery plate separator having improved physical properties. Another object is to provide an improved storage battery which will exhibit an increase in efficiency and longer life over similar batteries having conventional plate separators.

Broadly, this invention contemplates a plate separator, for liquid electrolyte storage batteries, consisting of porous polypropylene.

This invention also contemplates a storage battery cell containing a positive plate, a negative plate and a polypropylene separator disposed between said positive and negative plate.

The polypropylene operable in the practice of this invention may be made by any of the known methods which produce a relatively high crystalline polypropylene. It has been found that the polypropylene not exhibiting this characteristic, for example amorphous type polypropylene, will not have the desired and necessary porosity after fabrication into a battery separator. Among the polypropylene which may be used is the polypropylene made by conventional techniques using $TiCl_3$ or $TiCl_4$ in conjunction with organo-metallic compounds such as aluminum alkyls and Grignard reagents.

It has also been found that the polypropylene need not necessarily be in a high state of purity (obtained by repeated washings, etc.) prior to fabrication. In fact, it is preferable to employ a slightly impure polypropylene which exhibits a melting point range.

The physical and chemical properties of polypropylene, in general, allow these separators to be fabricated by relatively simple methods. Thus they may be made by forming a polypropylene water slurry and then exposing the slurry to sintering temperatures in a mold, utilizing calender rolls or preferably by the direct sintering of polypropylene powders under controlled conditions in a mold. If desired it is also possible to incorporate other materials into the basic material prior to the molding stage. For instance, acid-soluble material may be added to the polypropylene powders to increase the porosity.

As alluded to above, in the manufacture of battery separators, a high degree of uniformity and carefully controlled porosity are essential. To achieve these properties it has been found desirable to grind the polypropylene powder sufficiently to break up any aggregates prior to the molding step. Such grinding causes a more homogeneous composition, the porosity of which may be controlled by suitable adjustment of the amount of material packed into the mold. It has been found possible to produce a battery separator having high permeability coupled with electrical resistance as low as .049 ohm per square inch and the complete absence of pinholes or direct passages.

In order to illustrate more fully the nature of this invention and the manner of practising the same the following examples are presented.

*Example 1*

An autoclave of 435 cc. capacity was charged with a glass vial containing 2 g. of $TiCl_3$ in 30 cc. of heptane with a steel ball approximately 25 mm. in diameter for breaking the flask at the moment polymerization started. Subsequently, a solution of 5.7 g. of triethylaluminum, $Al(C_2H_5)_3$, in 50 cc. of n-heptane was fed into the autoclave under a blanket of nitrogen, and the autoclave was then heated to 70° C. 103 g. of liquid propylene was fed in and the autoclave was agitated in order to break the vial containing the $TiCl_3$.

After 6 hours, during which the temperature was maintained between 80 and 90° C., 50 cc. of methanol was pumped into the autoclave to decompose the catalyst, and pressed for approximately 10 minutes while the mold was mass was withdrawn from the autoclave. The product was purified; by washing, filtering and drying and any uncrystallized product was removed by solvent extraction. The polypropylene was then ground to a fine powder.

Approximately 10 g. of the polypropylene powder were then placed in an aluminum mold of dimensions 5¼ by 5 13/16 inches. The powder was then lightly compressed for approximately 10 minutes while the mold was heated to a temperature between 215° F. and 225° F. The back web of the finished battery separator was .025 inch thick and had an average electrical resistance (when submerged in a storage battery electrolyte) of .05 ohm per square inch of surface. It was porous and freely permeable by water or dilute sulfuric acid, but was highly acid-resistant, and withstood 192 hours' immersion in concentrated sulfuric acid (sp. gr. 1.84) at room temperature without any apparent charring. A commercially-obtained rubber separator, which was tested in concentrated acid under the same conditions, completely charred within two hours.

In respect to the polypropylene separator the test was terminated after the stated period; however, from these indications it is apparent that the separators made of this invention will withstand acid attack for even greater durations of acid exposure.

A lead acid storage battery cell was prepared, using conventional components including 7 positive and 8 negative plates and employing polypropylene separators made as just described instead of the usual impregnated wood or microporous rubber separators. For purposes of comparison, an identical storage battery cell was prepared, but using commercially-obtained 0.030 inch microporous separators having an average resistance of .05 ohm per square inch. The two cells were then formed according to conventional methods and subjected to the S.A.E. 300 amperes at 0° F. rating test.

These ratings are a measure of the cold-weather starting ability of a fully charged battery and are expressed in two ways: By the terminal voltage of a fully charged battery recorded after 5 seconds of discharge at 300 amperes with an initial electrolyte temperature of 0° F. and by the number of minutes required for the battery to reach a terminal voltage equivalent to 1.0 volt per cell when discharged under the same conditions referred to above.

After 5 seconds' discharge the cell made with separators according to this invention and the cell made with the rubber separators exhibited a cell voltage of 1.51 volts. This rate corresponds to 4.53 volts for three-cell batteries, and the average in the field is approximately 4.3 volts. The time required for the cell made with polypropylene separators to reach 1 volt was 4.82 minutes while the cell made with the rubber separator only took 4.10 minutes. The S.A.E. minimum requirement for this test is 3.5 minutes.

It will be seen that in terms of these tests the battery made with separtors according to this invention was equal to an unusually good control battery in respect to the 5 second discharge test but was better than the control as regards the time-voltage test, and that the polypropylene separators exhibited relatively complete acid resistance in contrast to the rubber separators.

*Example II*

A polypropylene composition was prepared as described in Example I, and separators made therefrom, also as in Example I. The separators were used in the assembly of a storage battery of the silver-zinc type, in conjunction with a strongly alkaline electrolyte. The separators were found to be highly efficient and completely unaffected by the alkaline electrolyte.

The process for manufacturing the fabricated articles of this invention is a simple one and may readily be carried out by persons without a high degree of training or skill. The process is, moreover, economical and capable of producing battery separators at costs competitive with those of less satisfactory materials heretofore available.

While this invention has been described with reference to certain preferred embodiments and illustrated by means of specific examples these are illustrative only and the invention is not to be construed as limited except as set forth in the following claims.

We claim:
1. A storage battery cell containing a positive electrode, a negative electrode and a crystalline polypropylene porous separator where the porosity of said separator is such that it allows the passage of electrolyte but is impervious to the passage of solid active electrode material, wherein said separator is disposed between said positive and negative electrodes.

2. A lead-acid storage battery having a positive electrode, a negative electrode and a crystalline polypropylene porous separator, where the porosity of said separator is such that it allows the passage of electrolyte but is impervious to the passage of solid active electrode material, wherein said separator is disposed between the positive and negative electrodes.

3. A storage battery having a positive electrode, a negative electrode and an alkaline electrolyte containing crystalline polypropylene porous separator, where the porosity of said separator is such that it allows the passage of electrolyte but is impervious to the passage of solid active electrode material wherein said separator is disposed between the positive and negative electrode.

References Cited in the file of this patent
UNITED STATES PATENTS 2,759,039    Clark _____ Aug. 14, 1956
2,868,772    Ray et al. _____ Jan. 13, 1959

OTHER REFERENCES

"Polypropylene," by Ottolenghi and Crespi, Modern Plastics, vol. 36, No. 1A, September 1958, pages 139 and 140.